April 5, 1949.  L. S. GREENLAND  2,466,415
PRESSURE SENSITIVE CAPSULES AND MIXTURE
CONTROL DEVICE EMBODYING THE SAME
Filed Aug. 9, 1944
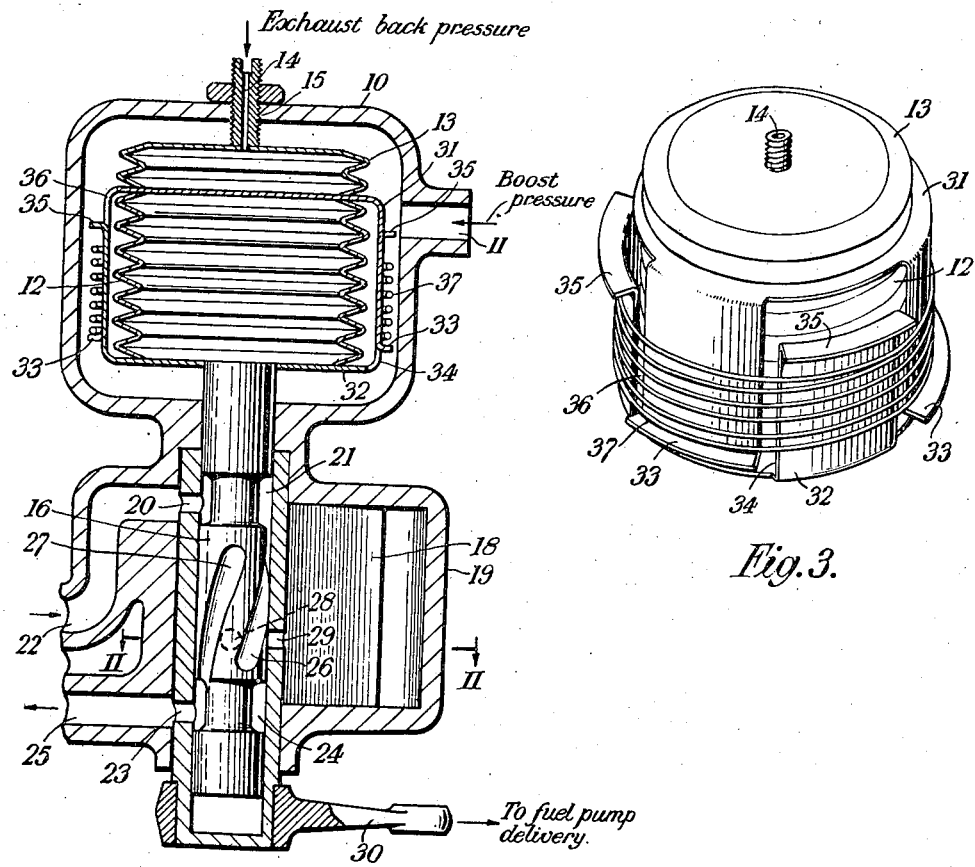
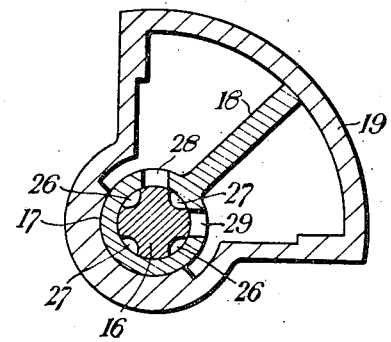
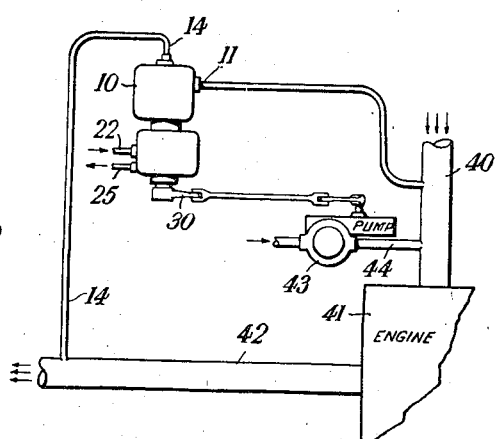
INVENTOR
LEONARD SIDNEY GREENLAND
by Moses, Nolte, Crews & Berry
Attorneys Patented Apr. 5, 1949

2,466,415

UNITED STATES PATENT OFFICE 2,466,415

PRESSURE SENSITIVE CAPSULE AND MIXTURE CONTROL DEVICE EMBODYING THE SAME

Leonard Sidney Greenland, Weston-Super-Mare, England, assignor to H. M. Hobson Limited, London, England Application August 9, 1944, Serial No. 548,756
In Great Britain January 3, 1944

7 Claims. (Cl. 123—119)

This invention relates to fuel regulating apparatus for aircraft engines and more particularly to pressure sensitive capsules therefor. One object of this invention is to provide a novel form of two rate pressure-sensitive capsule stack, associated with a spring for varying the rate of the capsule stack, said spring being operative on the capsule stack only over a given range of movement thereof and being automatically disconnected when the capsule stack movement is outside said range.

Another object of the invention is to utilize such two rate capsule to control the rate of flow of fuel to an aircraft engine as a combined function of boost pressure and exhaust back pressure, and to provide a change in mixture strength at a predetermined value of the boost pressure, the change point being unaffected by exhaust back pressure. One form of capsule according to the invention and associated servomotor for effecting this will now be described in detail by way of example, with reference to the accompanying drawing, in which:

Fig. 1 is a vertical section through the capsule stack and servomotor, showing the capsule stack compressed to an extent such that the spring is inoperative, Fig. 2 is a section on the line II—II in Fig. 1, Fig. 3 is a perspective view of the capsule stack, and Fig. 4 is a diagrammatic showing of the control unit coupled to the engine fuel system.

The capsule stack, which is contained in a chamber 10 exposed to boost pressure through an inlet 11, comprises a major evacuated lower section 12 which responds to changes in boost pressure, and a minor upper section 13 exposed internally to exhaust back pressure through a duct 14 formed in a screw 15 by which the composite capsule stack is adjustably secured to the top of the chamber. The lower end of the capsule stack is fixed to the operating valve 16 of a vane type servomotor.

The inlet 11 communicates with the induction pipe 40 of the engine 41, and the duct 14 with the exhaust pipe 42. A variable delivery fuel pump 43 supplies fuel to the induction pipe 40 through conduit 44 (Fig. 4).

The valve 16 is therefore moved axially in a surrounding sleeve 17 in accordance with changes in boost pressure and exhaust back pressure. The sleeve is fixed to the vane 18 of the servomotor which is rotatable in a correspondingly shaped housing 19. The sleeve 17 has an upper circumferential port 20 which establishes communication between an upper waisted portion 21 of the valve and an oil pressure inlet 22 in all positions of the vane, and a lower circumferential port 23 which establishes communication between a lower waisted portion 24 of the valve and an oil outlet 25 in all positions of the vane.

The valve is formed with four helical grooves, separated by correspondingly shaped lands, one pair of opposite grooves 26 being closed at their lower ends and open to pressure at their upper ends by communication with the space 21, and the other pair of opposite grooves 27 being closed at their upper ends and open at their lower ends to the oil outlet by communication with the space 24. The sleeve 17 has a pair of ports 28, 29 communicating respectively with the housing 19 on opposite sides of the vane 18. The vane takes up a position such that the ports 28, 29 are masked by adjoining lands of the valve, as shown in Fig. 2. Upward movement of the valve, due to contraction of the capsule stack, will however connect the port 28 to the adjoining pressure groove 26 and the port 29 to the adjoining oil outlet groove 27. The vane will therefore rotate clockwise as seen in Fig. 2 until the ports 28, 29 are again masked by the lands of the valve. On downward movement of the valve, the reverse action will take place, the port 29 being connected to a pressure groove in the valve and the port 28 to an oil outlet groove, and the vane will move anticlockwise. The direction and extent of rotation of the vane are thus determined by the direction and extent of axial movement of the valve, the rotation of the vane being a function of the axial movement of the valve. The sleeve 17, which of course turns with the vane, carries an arm 30 connected to means for varying the stroke of the pump 43 by which fuel is fed to the engine. The arrangement is such that clockwise movement of the vane as seen in Fig. 2 increases the rate of supply of fuel so that this increases as the boost pressure increases.

The section 12 of the capsule stack, which responds solely to changes in boost pressure, has upper and lower dished casing members 31, 32 fixed thereto at their respective upper and lower ends. The upper member 31 is formed with lugs 33 projecting through slots 34 in the lower member, and the lower member 32 is formed with lugs 35 projecting through slots 36 in the upper member. The lugs 33 are located below the lugs 35 so that expansion of the capsule stack will result in the two sets of lugs approaching each other. A helical compression spring 37 rests on the lower set of lugs.

At low boost pressures the capsule stack is highly expanded and the spring 37 is compressed and thus placed in operation, but as the boost increases the capsule stack gradually shortens, lifting the valve 16 so that pressure oil may enter port 28 and cause the vane 18 to turn in the direction to effect progressive increase in the rate of flow of fuel to the engine. At a given state of compression of the capsule stack, i. e. at a predetermined boost, the spring 37 will become inoperative (as indicated in Fig. 1) thus altering the rate of the capsule stack and providing the required enrichment of the mixture. With the spring in action the amount of movement of the capsule stack in response to a given change in boost pressure will be less than it will be without the spring. Clearly therefore the rate of change of fuel flow per unit change of boost pressure will be greater when the spring is inoperative so that the desired enrichment of the mixture is there obtained. The enrichment could not be obtained at a fixed boost by shaping of the lands of the valve 16 to scroll form, as described in the copending and now abandoned application of Maddox, Serial No. 551,703, filed August 29, 1944, and entitled Servomotors because of the effect of the portion of the capsule stack open to back pressure. By utilizing the spring however, which is rendered inoperative only when the compression of the evacuated part 12 of the capsule stack reaches a given value, the required point of enrichment is obtained as a function solely of boost pressure.

In U. S. Patent No. 2,031,527 there is described a capsule stack carrying at its ends dished casing members formed with lugs arranged similarly to those of the embodiment herein illustrated and with a spring in compression between them. The purpose of the spring in this earlier patent was however merely to limit the expansion of the capsule stack in case of puncture of one or more of the capsules, and no provision was made for the spring to become inoperative after the capsule stack attains a given state of compression.

The capsule stack according to the invention, which varies its rate at a given state of expansion owing to the spring coming into operation may however find other useful applications besides that illustrated, as it affords the possibility of dispensing with a cam and providing an extra function by virtue of its change of rate.

What I claim as my invention and desire to secure by Letters Patent is:

1. The combination with a pressure sensitive capsule stack of a spring for varying the rate of said stack, and an operative connection between the spring and the stack, which is effective over a given range of movement only of the stack and is otherwise ineffective, said spring assisting the capsule stack to resist change of shape only when said operative connection is effective.

2. The combination with a pressure sensitive capsule stack of a pair of dished casing members attached respectively to opposite ends of the stack, each casing member having a set of lugs projecting through slots in the other casing member, the two sets of lugs being arranged to approach one another as the capsule stack expands, and a spring mounted in compression between the two sets of lugs, the spring being in compression over a given range of movement only of the capsule stack and inoperative on the capsule stack when the compression of the capsule stack exceeds a given limit.

3. In apparatus for regulating the flow of fuel to an aircraft engine, the combination with an evacuated capsule stack enclosed in a chamber having an inlet for connection to boost pressure of a vane type servomotor, comprising a control valve formed with helical grooves and coupled to one end of said capsule stack, and a servo vane arranged to control the rate of supply of fuel to the engine, a second capsule stack interposed between the first capsule stack and a wall of the chamber, means for subjecting the interior of said second capsule stack to exhaust back pressure, and a spring operatively associated with the first capsule stack so as to assist it to resist expansion so long as its expansion is greater than a given limit, said spring being ineffective on said capsule stack when its expansion is less than said limit.

4. In apparatus for regulating the flow of fuel to an aircraft engine, a combination as claimed in claim 3, which includes a pair of dished casing members attached respectively to opposite ends of the first capsule stack, each casing member having a set of lugs projecting through slots in the other casing member, said sets of lugs being arranged to approach one another as said capsule stack expands, the spring being a compression spring located between said sets of lugs and being maintained in compression only when the expansion of the capsule stack exceeds said predetermined limit.

5. Apparatus for regulating the flow of fuel to an aircraft engine as a conjoint function of boost pressure and exhaust back pressure, and for providing an enrichment in the fuel/air ratio supplied to the engine when the boost pressure exceeds a given limit, said apparatus comprising a servomotor for adjusting the fuel flow and including a control valve, and a capsule assemblage for operating said servomotor, said capsule assemblage comprising a first capsule stack which is evacuated, located in a chamber having an inlet for connection to boost pressure and connected at one end to said control valve, a second capsule stack interposed between the first capsule stack and a wall of the chamber, means for subjecting the interior of said second capsule stack to exhaust back pressure, and a spring operatively associated with the first capsule stack so as to assist it to resist expansion so long as its expansion is greater than a given limit, said spring being ineffective on said capsule stack when its expansion is less than said limit.

6. In combination, a chamber having an inlet to a source of pressure, a stack of pressure responsive capsules contained therein and anchored at one end to a wall of said chamber, a member connected to the other end of said capsule stack and arranged to move as the overall length of said capsule stack changes in response to variations in the pressure within said chamber, a spring operatively associated with the capsule stack so as to assist it to resist change in shape only when the overall length of said stack lies within predetermined limits, the spring otherwise being ineffective, so that the extent of movement of said member in response to a given change of pressure has one value when the overall length of the capsule stack is within said limits and another value when the overall length of the capsule stack is outside said limits.

7. In combination, a chamber having an inlet to a source of pressure, a stack of pressure responsive capsules contained therein and anchored at one end to a wall of said chamber, a member connected to the other end of said capsule stack and arranged to move as the overall length of said capsule stack changes in response to variations in the pressure within said chamber, a pair of dished casing members attached respectively to opposite ends of said capsule stack, a set of lugs on each of said casing members which sets are caused to approach one another as the overall length of the capsule stack increases, and a spring located between said sets of lugs and arranged to be compressed thereby when the overall length of the capsule stack exceeds a given limit, thereby assisting the capsule stack to resist change of shape, but to be inoperative on the capsule stack when the overall length thereof is less than said given limit.

LEONARD SIDNEY GREENLAND.

REFERENCES CITED

The following references are of record in the file of this patent:

UNITED STATES PATENTS

| Number | Name | Date |
|---|---|---|
| 2,031,527 | Dodson | Feb. 18, 1936 |
| 2,072,617 | Cate | Mar. 2, 1937 |
| 2,119,317 | Dasher | May 31, 1938 |
| 2,132,486 | Lichte | Oct. 11, 1938 |
| 2,230,036 | Hawlitscheck et al. | Jan. 28, 1941 |
| 2,245,562 | Becker | June 17, 1941 |
| 2,273,670 | Udale | Feb. 17, 1942 |
| 2,279,048 | Kittler | Apr. 7, 1942 |
| 2,305,070 | Butler et al. | Dec. 15, 1942 |

FOREIGN PATENTS

| Number | Country | Date |
|---|---|---|
| 801,587 | France | Aug. 7, 1936 |